(12) United States Patent
Han et al.

(10) Patent No.: US 10,389,221 B2
(45) Date of Patent: Aug. 20, 2019

(54) POWER TRANSMISSION APPARATUS USING MAGNETIC FIELD

(71) Applicants: Seungjoo Han, Busan (KR); Byungho Han, Busan (KR); Jongtaek Han, Busan (KR)

(72) Inventors: Seungjoo Han, Busan (KR); Byungho Han, Busan (KR); Jongtaek Han, Busan (KR)

( * ) Notice: Subject to any disclaimer, the term of this patent is extended or adjusted under 35 U.S.C. 154(b) by 230 days.

(21) Appl. No.: 15/315,030

(22) PCT Filed: Aug. 4, 2015

(86) PCT No.: PCT/KR2015/008149
§ 371 (c)(1),
(2) Date: Nov. 30, 2016

(87) PCT Pub. No.: WO2016/021918
PCT Pub. Date: Feb. 11, 2016

(65) Prior Publication Data
US 2017/0201169 A1    Jul. 13, 2017

(30) Foreign Application Priority Data
Aug. 6, 2014    (KR) .......................... 10-2014-0100927

(51) Int. Cl.
*H02K 49/10* (2006.01)
*F04D 17/10* (2006.01)
(Continued)

(52) U.S. Cl.
CPC ........... *H02K 49/108* (2013.01); *F04D 17/10* (2013.01); *F04D 25/026* (2013.01); *F04D 25/06* (2013.01);
(Continued)

(58) Field of Classification Search
None
See application file for complete search history.

(56) References Cited

U.S. PATENT DOCUMENTS

2002/0117933 A1* 8/2002 Joong ...................... B60K 6/26
310/261.1

FOREIGN PATENT DOCUMENTS

| JP | 06-280779 A | 10/1994 |
| JP | 09-313600 A | 12/1997 |

(Continued)

*Primary Examiner* — Alex Torres-Rivera
*Assistant Examiner* — Henry E Lee, III
(74) *Attorney, Agent, or Firm* — Patent Office of Dr. Chung Park

(57) ABSTRACT

The present invention relates to a power transmission apparatus using a magnetic field, the power transmission apparatus comprising a rotor module, a front driver module and a rear driver module, or comprising a rotor module and any one of a front driver module and a rear driver module. The power transmission apparatus generates, using power received from a power applying driving body or power received from a power receiving driving body, rotational power from a combination of an induced magnetic field which the front driver module generates, a rotating magnetic field which the rotor module generates, and a rotating magnetic field which the rotor module generates together with the front driver module and the rear driver module, and acceleratedly rotates to increase the rotational power, thereby transmitting power to the power receiving driving body and to a target object.

5 Claims, 11 Drawing Sheets

(51) Int. Cl.
*F04D 25/02* (2006.01)
*F04D 25/06* (2006.01)
*H02K 49/06* (2006.01)
*H02K 21/24* (2006.01)
*F02B 33/40* (2006.01)
*F02B 39/10* (2006.01)
*F02B 39/12* (2006.01)

(52) U.S. Cl.
CPC ............ *H02K 21/24* (2013.01); *H02K 49/065* (2013.01); *F02B 33/40* (2013.01); *F02B 39/10* (2013.01); *F02B 39/12* (2013.01)

(56) References Cited

FOREIGN PATENT DOCUMENTS

| | | |
|---|---|---|
| KR | 10-2010-0052772 A | 5/2010 |
| KR | 10-1237023 B1 | 2/2013 |
| KR | 10-2014-0088581 A | 7/2014 |

\* cited by examiner

[FIG. 1]
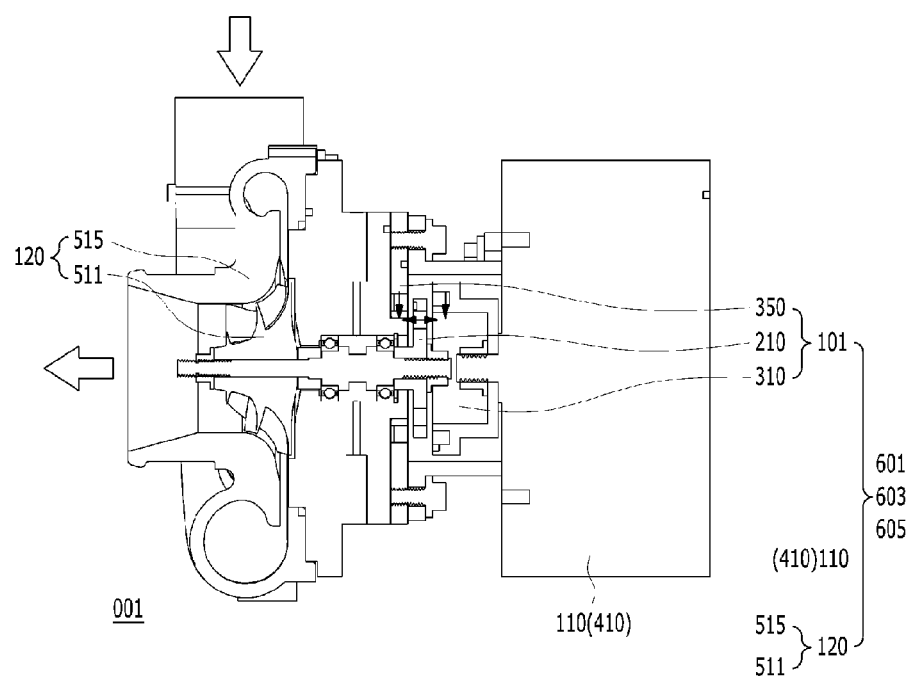

[FIG. 2]
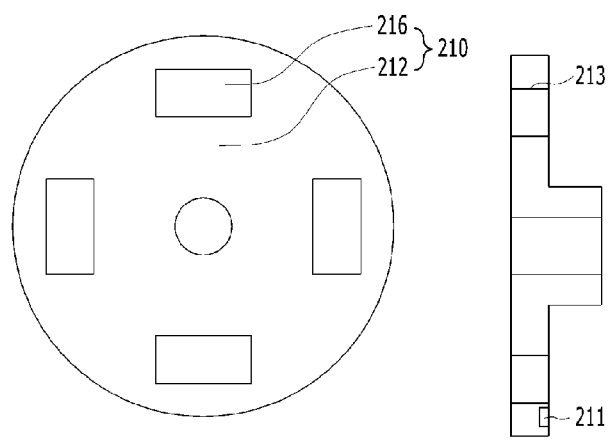

[FIG. 3]
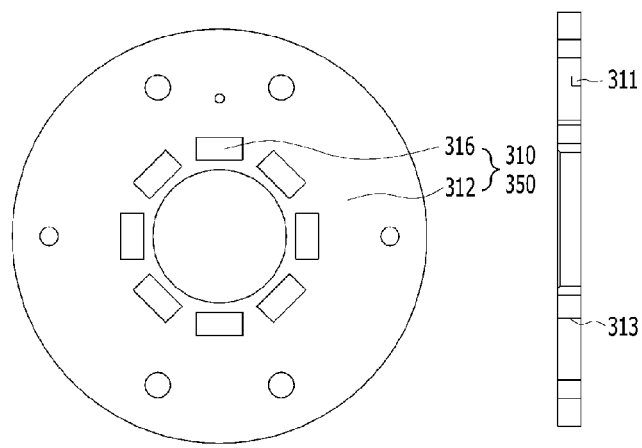
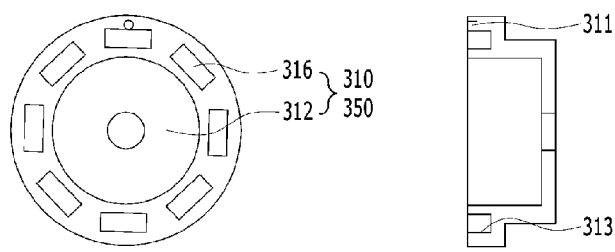

[FIG. 4]
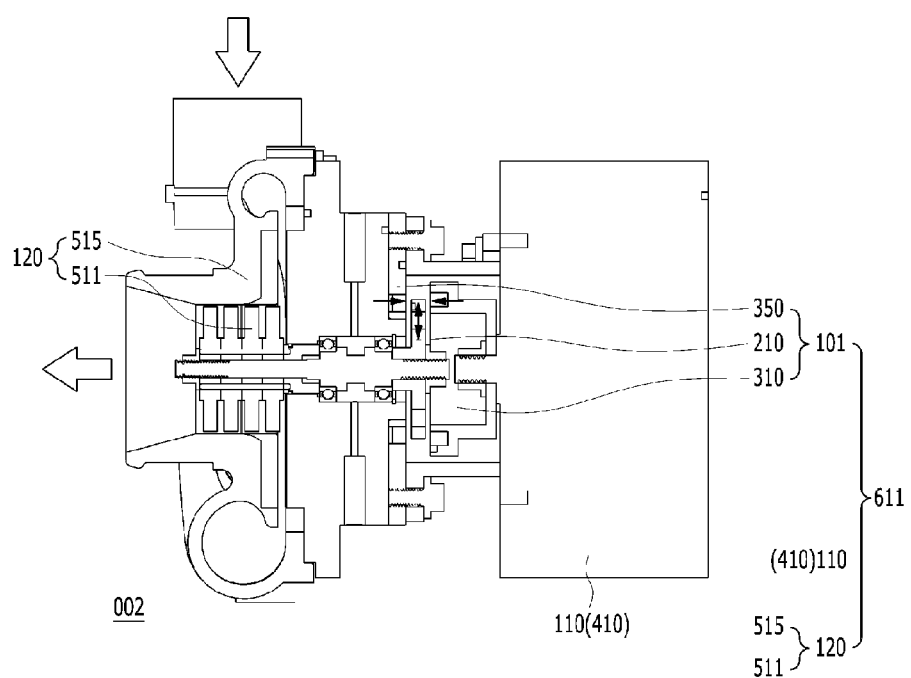

[FIG. 5]
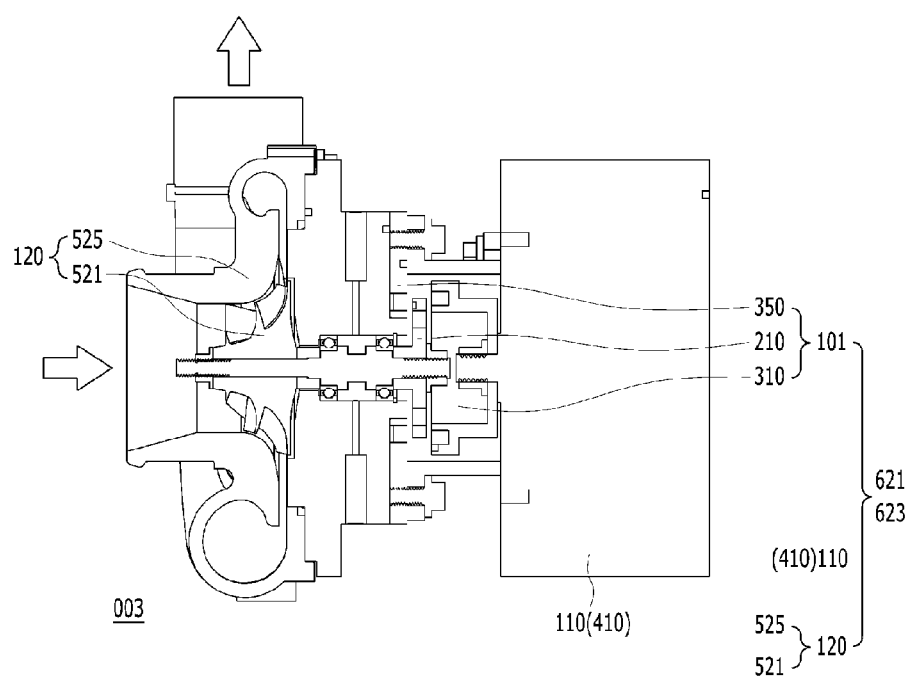

[FIG. 6]
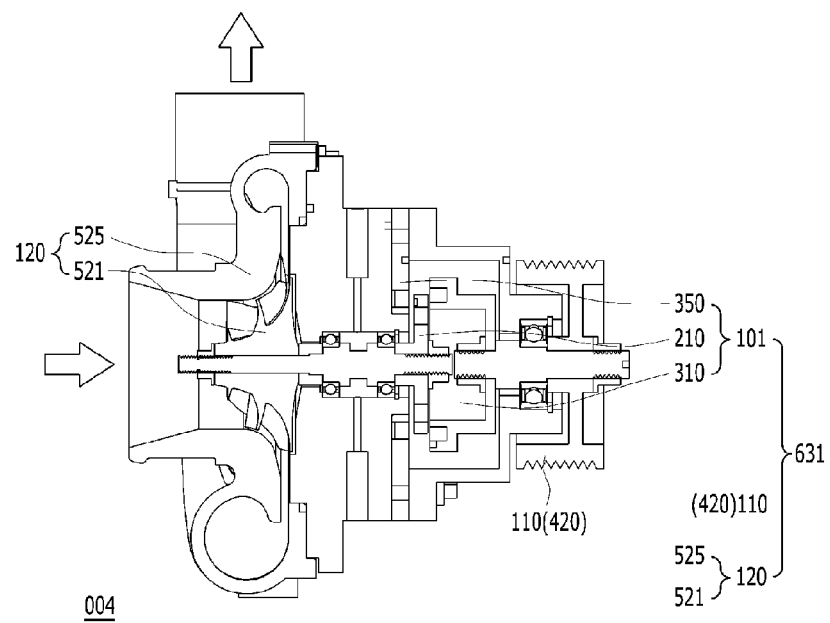

[FIG. 7]
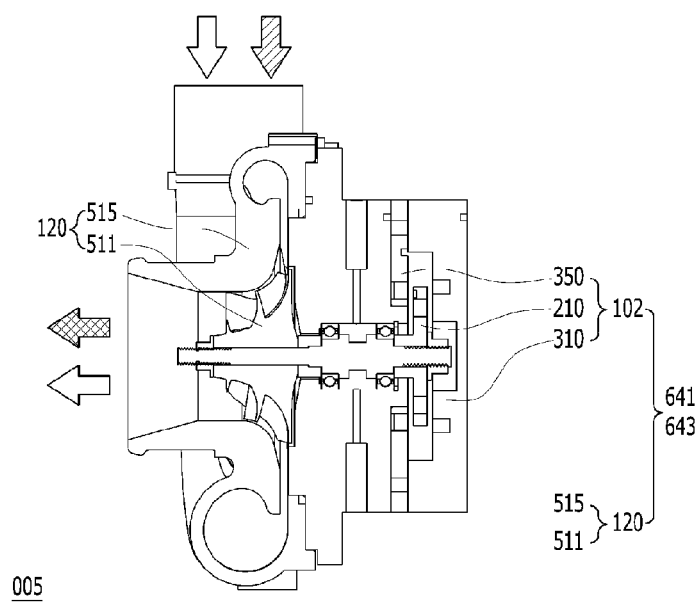

[FIG. 8]
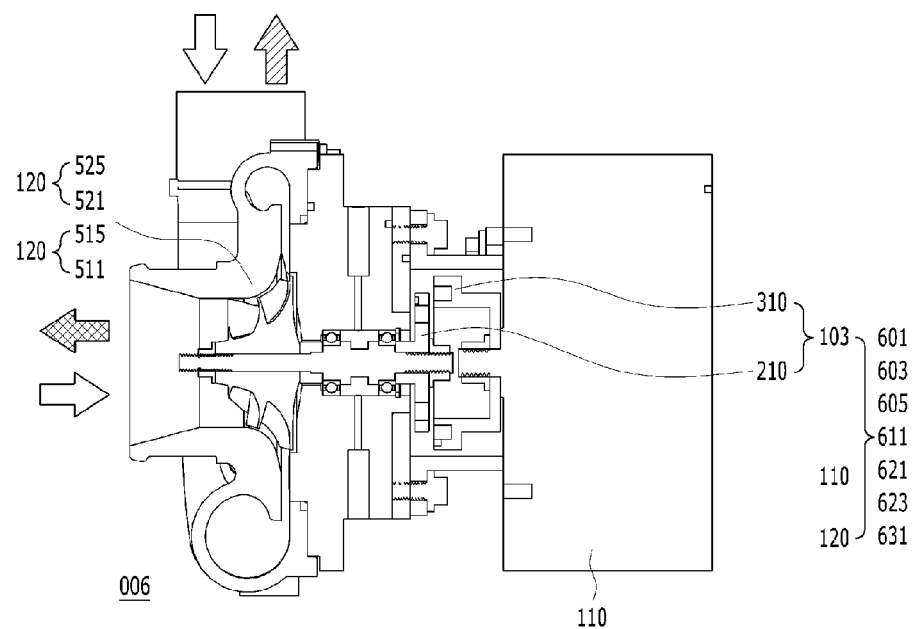

[FIG. 9]
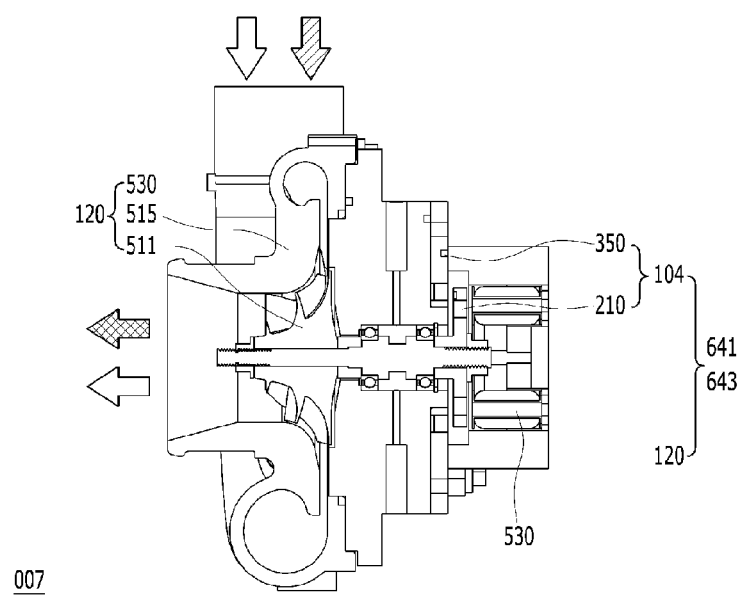

[FIG. 10]
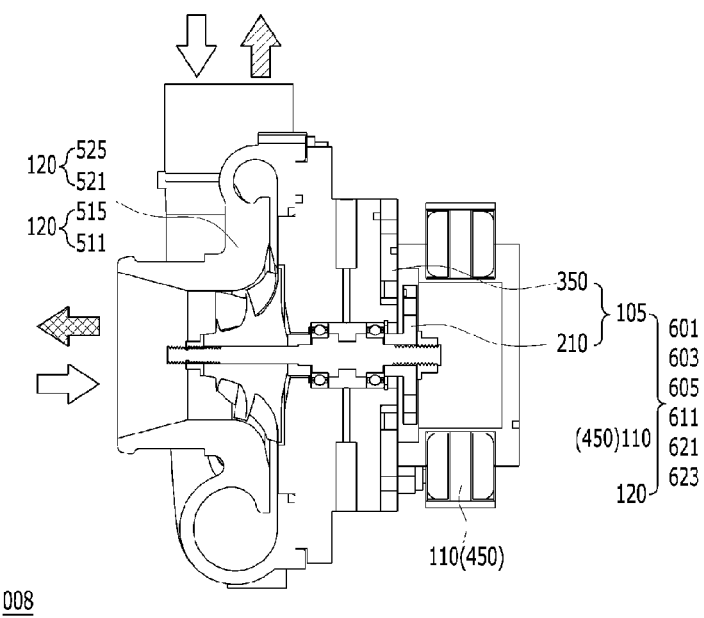

[FIG. 11]
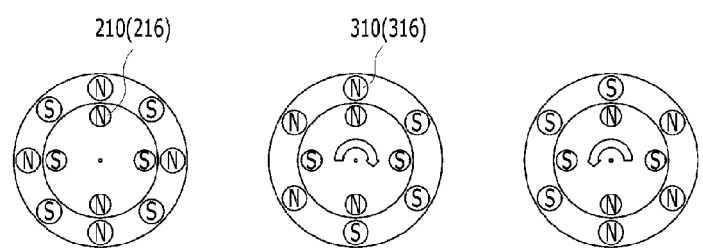

POWER TRANSMISSION APPARATUS USING MAGNETIC FIELD

CROSS-REFERENCE TO PRIOR APPLICATIONS

This application is a national Stage Patent Application of PCT International Patent Application No. PCT/KR2015/008149, filed on Aug. 4, 2015 under 35 U.S.C. § 371, which claims priority of Korean Patent Application No. 10-2014-0100927, filed on Aug. 6, 2014, which are all hereby incorporated by reference in their entirety.

TECHNICAL FIELD

The present invention relates to a power transmission apparatus that is capable of producing a rotational force from magnetic fields generated by receiving rotational power, increasing the rotational force, and finally transmitting the rotational power.

BACKGROUND ART

Generally, thermo-fluid energy is converted into mechanical energy through a heat engine like an internal combustion engine or external combustion engine as means for supplying power to a driving body, or electric energy is converted into mechanical energy through an electric motor, so that power is generated and provided directly to the driving body or is provided to a connected system through a connection member like a gear or belt.

Further, fuel as means for producing electric power is burnt, and accordingly, a turbine is driven through a thermal cycle to generate rotational power. Otherwise, the rotational power is generated using natural energy like a wind force or flowing water. Using the rotational power, a generation apparatus is driven to produce the electric power.

With the rotational power or generation power obtained through the above processes, apparatuses are driven and variously used for their purpose, but in the energy converting process, thermo-fluid loss and friction loss may be undesirably caused. Accordingly, when the amount of energy obtained with respect to the amount of energy supplied is indicated as an energy efficiency, many endeavors for enhancing the energy efficiency have been made through the reduction of the energy loss.

In an electric air cooler for a cold air blow, an electric air cooler for an air conditioner, an electric air accelerator for a vacuum cleaner, and an electric air supplier for a fuel cell vehicle, for examples, a thermal fluid loss and a frictional loss are generally generated, and accordingly, many tries for improving their efficiency should be needed.

On the other hand, a naturally aspirated vehicle is configured wherein since a naturally aspirated internal combustion engine that sucks air in an air sucking process and supplies the air to a combustion chamber is not charged with the amount of air corresponding to the amount of air discharged by means of the air sucking resistance generated in an air suction pipe, there is a limitation in increasing the output, and so as to improve the charging efficiency, accordingly, an inertially pressurized and supercharged air supply type RAM-air charging system using a vehicle speed is adopted. However, the inertially pressurized and supercharged air supply raises the density of air of head wind only while the vehicle is being driven at a high speed and thus increases the charging efficiency, and accordingly, the inertially pressurized and supercharged air supply is limitedly applied to some of vehicles.

A supercharger like a turbocharger for a supercharged vehicle is mounted on an exhaust manifold exit port surface to drive a turbine wheel and a compressor wheel connected to the turbine wheel by using exhaust gas energy increased according to the load of an internal combustion engine, to compress sucked air, to raise the density of air, and to supply the air to the air suction pipe of the internal combustion engine, thereby increasing the charging efficiency and the output of the internal combustion engine. However, the supercharged vehicle having the turbocharger has a sufficient boost pressure in a high speed driving region, but causes low exhaust gas energy in a low speed driving region so that it does not obtain a desired boost pressure. At this time, disadvantageously, the response time of the vehicle is delayed upon the change of load between the low speed driving region and the dynamic region, an oil supply device is needed to protect the vehicle from exhaust heat, and the load of internal combustion engine is raised due to the increment of back pressure in the high speed driving region. So as to solve the above-mentioned problems, a variable turbocharger, a two-stage turbocharger, a twin charge integral type electrical auxiliary turbocharger, and a complex sequential type supercharging system have been developed and applied to obtain a desired boost pressure and to increase the charging efficiency. However, their structure becomes complicated due to the increment of the number of parts related thereto, and their manufacturing cost becomes high due to the addition of a control system.

A supercharger like a centrifugal supercharger for a supercharged vehicle is configured wherein a set of gear is rotated using a frictional force of a pulley connected through a belt to the rotational power of an internal combustion engine, an impeller is driven with the number of rotations raised by using a gear ratio, and the sucked air to the internal combustion engine is compressed and supplied to an air suction pipe, thereby enhancing the charging efficiency and the output of the internal combustion engine. However, a compressor is driven in proportion to the number of rotations of a crank shaft, so that the response characteristics of the vehicle are excellent upon the change of load of the internal combustion engine, but contrarily, the number of rotations of the internal combustion engine driving the impeller is low on low speed driving, thereby delaying the formation of the boost pressure to cause the delay of acceleration. Further, the number of rotations of the crank shaft is increased to cause the load of the pulley driving the gears to be raised, thereby disadvantageously increasing the driving loss of the internal combustion engine, the noise generated from a connection member, the amount of fuel consumed, and operating costs.

Further, a naturally aspirated vehicle is configured wherein since a naturally aspirated internal combustion engine that sucks air in an air sucking process and supplies the air to a combustion chamber is not charged with the amount of air corresponding to the amount of air discharged by means of the air sucking resistance generated in an air suction pipe, there is a limitation in increasing the output, and so as to improve the charging efficiency, accordingly, the diameter of the air suction pipe is increased to enlarge the flow rate path, the surface of the air suction pipe is smooth to reduce the frictional resistance, or a vortex generation device is provided to enhance an inertial force. However, even if the loss of inertial energy of air flowing in the air suction pipe is reduced, the inertial energy is not almost changed just with the variation of the air flow, thereby failing to achieve a high charging efficiency. Further, the vortex generation device acts as a resistance in a portion of the operating region thereof.

Furthermore, a supercharged vehicle having a turbocharger or supercharger is configured to have an air or water cooling device mounted between an exit port of the supercharger and an air suction pipe of an internal combustion engine to lower the temperature of the compressed air supplied from a combustion chamber and to enhance the density of air, thereby improving the supercharging efficiency. If the vehicle stops or is slowly driven, however, cooling performance becomes bad to cause knocking or lower the charging efficiency, and accordingly, cooling capacity should be increased over the whole driving region. However, there is a limitation in mounting the cooling device if the size of the cooling device is increased to improve the cooling performance, and further, there is a limitation in enhancing the cooling efficiency through an electric fan mounted on the cooling device and through the increment of the number of cooling fins, which undesirably raises the manufacturing cost.

DISCLOSURE

Technical Problem

Accordingly, the present invention has been made in view of the above-mentioned problems occurring in the prior art, and it is an object of the present invention to provide a power transmission apparatus using magnetic fields that is applied to an electric air cooler for a cold air blower, an electric air cooler for an air conditioner, an electric air accelerator for a vacuum cleaner, and an electric air supplier for a fuel cell vehicle, so that a rotational force is produced by an induced magnetic field generated from the rotational power of an electric motor and is increased to transmit the rotational power to an expander or impeller, thereby conducting the power transmission in a simple configuration and achieving small amounts of driving loss and noise, good durability, and no additional driving cost.

It is another object of the present invention to provide a power transmission apparatus using magnetic fields that is applied to an electric air charger for a supercharged vehicle and an electric expanded air charger for a naturally aspirated vehicle, so that a rotational force is produced by an induced magnetic field and a rotating magnetic field generated from the rotational power of an electric motor and is increased to transmit the rotational power to an expander or impeller, thereby conducting the power transmission in a simple configuration and achieving small amounts of driving loss and noise, good durability, and no additional driving cost.

It is yet another object of the present invention to provide a power transmission apparatus using magnetic fields that is applied to a mechanical air charger for a supercharged vehicle and a mechanical expanded air charger for a naturally aspirated vehicle, so that a rotational force is produced by an induced magnetic field, a rotating magnetic field, and an intake pressure of an internal combustion engine generated from the rotational power of an idle pulley drivedly mounted on a belt drive system of the internal combustion engine and is increased to transmit the rotational power to an expander or impeller, thereby conducting the power transmission in a simple configuration and achieving small amounts of driving loss and noise, good durability, and no additional driving cost.

It is still yet another object of the present invention to provide a power transmission apparatus using magnetic fields that is applied to an air cooler for a naturally aspirated vehicle, so that a rotational force is produced by a rotating magnetic field generated from the power of air flow generated from an intake pressure and is increased to transmit the rotational power to an expander, thereby conducting the power transmission in a simple configuration and achieving small amounts of driving loss and noise, good durability, and no additional driving cost.

It is yet another object of the present invention to provide a power transmission apparatus using magnetic fields that is applied to an air cooler for a supercharged vehicle, so that a rotational force is produced by a rotating magnetic field generated from the power of air flow generated from a boost pressure and is increased to transmit the rotational power to an expander, thereby conducting the power transmission in a simple configuration and achieving small amounts of driving loss and noise, good durability, and no additional driving cost.

It is another object of the present invention to provide a power transmission apparatus using magnetic fields that produces a rotational force from a combination of an induced magnetic field and a rotating magnetic field produced by the power of a power applying driving body or the power of a power receiving driving body and increases the rotational force to transmit the rotational power to the power receiving driving body and a power receiving object, thereby conducting the power transmission in a simple configuration, achieving small amounts of driving loss and noise, good durability, and no additional driving cost, and reducing emission of greenhouse gases such as carbon dioxide by increasing the transmission efficiency with low energy consumption.

Technical Solution

To accomplish the above-mentioned objects, according to a first aspect of the present invention, there is provided a power transmission apparatus using magnetic fields, the apparatus including: a rotor module mounted on a power applying driving body; a front driver module on a rotating shaft of the power applying driving body; and a rear driver module on the rotor module in such a manner as to receive power from the power applying driving body.

At this time, desirably, a rotational force is produced by an induced magnetic field generated by the front driver module, a rotating magnetic field generated by the rotor module, and a rotating magnetic field generated by the rotor module together with the rear driver module, using the rotational power supplied from the power applying driving body, and is increased to transmit the rotational power to a power receiving object.

According to the present invention, desirably, the rotor module includes: a rotary plate having 2n (n is an integer) permanent magnet insertion holes formed equally spaced with respect to a reference point on the circumferential axis of a disc-shaped body having a rotating shaft through hole formed on the center thereof; and 2n permanent magnets inserted into the permanent magnet insertion holes with respect to the reference point of the rotary plate in such a manner where N and S poles are alternately insertedly attached thereto, the magnetic fluxes of the permanent magnets being produced in the axial direction of the rotating shaft or in the direction perpendicular to the axial direction thereof.

According to the present invention, desirably, each of the front driver module and the rear driver module includes: a fixing rod having 2n (n is an integer greater than 2) or 3n permanent magnet insertion holes formed equally spaced in a circumferential direction around the rotor module with respect to a reference point on the circumferential axis of a cylindrical or disc-shaped body having a rotating shaft through hole formed on the center thereof in such a manner as to be closed on one surface thereof, while having a given gap from the rotor module; and 2n or 3n permanent magnets attachedly inserted into the 2n or 3n permanent magnet insertion holes with respect to the reference point of the fixing rod in such a manner where N and S poles are alternately insertedly attached thereto or insertedly attached thereto with three-phase arrangements, the magnetic fluxes of the 2n or 3n permanent magnets being produced in the direction perpendicular to the magnetic fluxes of the 2n or 3n permanent magnets of the rotor module.

To accomplish the above-mentioned objects, according to a second aspect of the present invention, there is provided a power transmission apparatus using magnetic fields, the apparatus including: a rotor module mounted on a power receiving driving body to mount a rotary body of the power receiving driving body; and a front driver module and a rear driver module mounted on the rotor module to receive the power from the power receiving driving body.

At this time, desirably, a rotational force is produced by a rotating magnetic field generated by the rotor module together with the front driver module and the rear driver module, using the rotational power supplied from the power receiving driving body, and is increased to transmit the rotational power to the power receiving driving body.

To accomplish the above-mentioned objects, according to a third aspect of the present invention, there is provided a power transmission apparatus using magnetic fields, the apparatus including: a rotor module mounted on a power applying driving body; and a front driver module mounted on the rotating shaft of the power applying driving body to receive the power from the power applying driving body.

According to the present invention, desirably, a rotational force is produced by an induced magnetic field generated by the front driver module and a rotating magnetic field generated by the rotor module, using the rotational power supplied from the power applying driving body, and is increased to transmit the rotational power to a power receiving object.

To accomplish the above-mentioned objects, according to a fourth aspect of the present invention, there is provided a power transmission apparatus using magnetic fields, the apparatus including: a rotor module mounted on a power receiving driving body to mount a rotary body of the power receiving driving body; and a rear driver module mounted on the rotor module in such a manner as to receive the power from the power receiving driving body.

According to the present invention, desirably, a rotational force is produced by a rotating magnetic field generated by the rotor module and a rotating magnetic field generated by the rotor module together with the rear driver module, using the rotational power supplied from the power receiving driving body, and is increased to transmit the rotational power and the power of the rotating magnetic fields to the power receiving driving body.

To accomplish the above-mentioned objects, according to a fifth aspect of the present invention, there is provided a power transmission apparatus using magnetic fields, the apparatus including: a rotor module mounted on a power applying driving body; and a rear driver module mounted on the rotor module in such a manner as to receive the power from the power applying driving body.

According to the present invention, desirably, a rotational force is produced by a rotating magnetic field generated by the rotor module and a rotating magnetic field generated by the rotor module together with the rear driver module, using the power of the induced magnetic field supplied from the power applying driving body, and is increased to transmit the rotational power to a power receiving driving body.

Advantageous Effects

According to the present invention, the power transmission apparatus is applied to an electric air cooler for a cold air blower, an electric air cooler for an air conditioner, an electric air supplier for a fuel cell vehicle, and an electric air accelerator for a vacuum cleaner, so that the rotational force is produced by the induced magnetic field generated from the front driver module, the rotating magnetic field generated from the rotor module, and the rotating magnetic field generated from the rotor module together with the rear driver module, using the rotational power of the low power motor, and is increased to allow the rotor module to transmit the rotational power to the expander or impeller, thereby conducting the power transmission in a simple configuration and achieving small amounts of driving loss and noise, good durability, and no additional driving cost.

According to the present invention, further, the power transmission apparatus is applied to an electric expanded air charger for a naturally aspirated vehicle and an electric air charger for a supercharged vehicle, so that the rotational force is produced by the induced magnetic field generated from the front driver module, the rotating magnetic field generated from the rotor module, and the rotating magnetic field generated from the rotor module together with the rear driver module, using the rotational power of the low power motor, and is increased to transmit the rotational power to the expander or impeller, thereby conducting the power transmission in a simple configuration and achieving small amounts of driving loss and noise, good durability, and no additional driving cost.

According to the present invention, furthermore, the power transmission apparatus is applied to a mechanical air charger for a supercharged vehicle, so that the rotational force is produced by the induced magnetic field generated from the front driver module, the rotating magnetic field generated from the rotor module, and the rotating magnetic field generated from the rotor module together with the rear driver module, using the rotational power of the idle pulley drivedly mounted on the belt drive system of the internal combustion engine, and is increased to transmit the rotational power to the expander or impeller, thereby conducting the power transmission in a simple configuration and achieving small amounts of driving loss and noise, good durability, and no additional driving cost.

According to the present invention, furthermore, the power transmission apparatus is applied to an air cooler for a naturally aspirated vehicle and an air cooler for a supercharged vehicle, so that the rotational force is produced by the rotating magnetic field generated from the rotor module together with the front driver module and the rear driver module, using the power of air flow generated from the intake pressure or the power of air flow generated from the boost pressure of the internal combustion engine, and is increased to allow the rotor module to transmit the rotational power to the expander, thereby conducting the power transmission in a simple configuration and achieving small amounts of driving loss and noise, good durability, and no additional driving cost.

According to the present invention, further, the power transmission apparatus is applied to an electric air cooler for a cold air blower, an electric air cooler for an air conditioner, an electric air accelerator for a vacuum cleaner, an electric air supplier for a fuel cell vehicle, an electric expanded air charger for a naturally aspirated vehicle, and an electric air charger for a supercharged vehicle, so that the rotational force is produced by the induced magnetic field generated from the front driver module and the rotating magnetic field generated from the rotor module, using the rotational power of the low power motor, and is increased to allow the rotor module to transmit the rotational power to the expander or impeller, thereby conducting the power transmission in a simple configuration and achieving small amounts of driving loss and noise, good durability, and no additional driving cost.

According to the present invention, in addition, the power transmission apparatus is applied to an air cooler for a naturally aspirated vehicle and an air cooler for a supercharged vehicle, so that the rotational force is produced by the rotating magnetic field generated from the rotor module together with the rear driver module, using the power of air flow generated from the intake pressure or the power of air flow generated from the boost pressure of the internal combustion engine, and is increased to allow the rotor module to transmit the rotational power to the expander, thereby conducting the power transmission in a simple configuration and achieving small amounts of driving loss and noise, good durability, and no additional driving cost.

According to the present invention, additionally, the power transmission apparatus is applied to a magnetic drive air cooler for a cold air blower, a magnetic drive air cooler for an air conditioner, a magnetic drive air accelerator for a vacuum cleaner, a magnetic drive air supplier for a fuel cell vehicle, a magnetic drive expanded air charger for a naturally aspirated vehicle, and a magnetic drive air charger for a supercharged vehicle, so that the rotational force is produced by the rotating magnetic field generated from the rotor module and the rotating magnetic field generated from the rotor module together with the rear driver module, using the power of the induced magnetic field supplied from a magnetic generator using low power, and is increased to transmit the rotational power to the expander or impeller, thereby conducting the power transmission in a simple configuration and achieving small amounts of driving loss and noise, good durability, and no additional driving cost.

According to the present invention, furthermore, the power transmission apparatus produces the rotational force from a combination of the induced magnetic field generated from the front driver module, the rotating magnetic field generated from the rotor module, and the rotating magnetic field generated from the rotor module together with the front driver module and the rear driver module, using the power of the power applying driving body or the power of the power receiving driving body, and increases the rotational force to transmit the rotational power to the power receiving driving body and the power receiving object, thereby conducting the power transmission in a simple configuration, achieving small amounts of driving loss and noise, good durability, and no additional driving cost, and reducing emission of greenhouse gases such as carbon dioxide by increasing the transmission efficiency with low energy consumption.

DESCRIPTION OF DRAWINGS

FIG. 1 is a perspective view showing an electric air cooler for a cold air blower, an electric air cooler for an air conditioner, and an electric expanded air charger for a naturally aspirated vehicle, to which a power transmission apparatus using magnetic fields according to a first embodiment of the present invention is applied.

FIG. 2 is a sectional perspective view showing a rotor module in the power transmission apparatus according to the first embodiment of the present invention.

FIG. 3 is a sectional perspective view showing a front rotor and a rear rotor in the power transmission apparatus according to the first embodiment of the present invention.

FIG. 4 is a perspective view showing an electric air accelerator for a vacuum cleaner to which the power transmission apparatus according to the first embodiment of the present invention is applied.

FIG. 5 is a perspective view showing an electric air charger for a supercharged vehicle and an electric air supplier for a fuel cell vehicle, to which the power transmission apparatus according to the first embodiment of the present invention is applied.

FIG. 6 is a perspective view showing a mechanical air accelerator for a supercharged vehicle to which the power transmission apparatus according to the first embodiment of the present invention is applied.

FIG. 7 is a perspective view showing an air cooler for a naturally aspirated vehicle and an air cooler for a supercharged vehicle, to which a power transmission apparatus using magnetic fields according to a second embodiment of the present invention is applied.

FIG. 8 is a perspective view showing an electric air cooler for a cold air blower, an electric air cooler for an air conditioner, an electric air accelerator for a vacuum cleaner, an electric air supplier for a fuel cell vehicle, an electric expanded air charger for a naturally aspirated vehicle, and electric and mechanical air chargers for a supercharged vehicle, to which a power transmission apparatus using magnetic fields according to a third embodiment of the present invention is applied.

FIG. 9 is a perspective view showing air coolers for a naturally aspirated vehicle and a supercharged vehicle to which a power transmission apparatus using magnetic fields according to a fourth embodiment of the present invention is applied.

FIG. 10 is a perspective view showing a magnetic drive air cooler for a cold air blower, a magnetic drive air cooler for an air conditioner, a magnetic drive air accelerator for a vacuum cleaner, a magnetic drive air supplier for a fuel cell vehicle, a magnetic drive expanded air charger for a naturally aspirated vehicle, and a magnetic drive air charger for a supercharged vehicle, to which a power transmission apparatus using magnetic fields according to a fifth embodiment of the present invention is applied.

FIG. 11 is a side view showing the arrangements of permanent magnets on the rotor module and driver modules according to the present invention.

BEST MODE FOR INVENTION

Hereinafter, an explanation on the parts and operations of a power transmission apparatus using magnetic fields according to the present invention will be in detail given with reference to the attached drawing.

Now, an explanation on the parts and operations of a power transmission apparatus using magnetic fields according to a first embodiment of the present invention will be given.

First, the parts of the power transmission apparatus will be explained.

As shown in FIGS. 1, 4, 5, 6 and 11, a power transmission apparatus 101 according to a first embodiment of the present invention includes a rotor module 210 and a front driver module 310 and a rear driver module 350 disposed on the front and rear sides of the rotor module 210 to produce magnetic fields around the rotor module 210. In the configuration, the rotor module 210 is mounted on a power applying driving body 110, the front driver module 310 on a rotating shaft of the power applying driving body 110, and the rear driver module 350 on the rotor module 210.

In more detail, the power transmission apparatus 101 includes the rotor module 210 and the front driver module 310 and the rear driver module 350 disposed on the front and rear sides of the rotor module 210 to produce the magnetic fields around the rotor module 210 in such a manner where the rotor module 210 is mounted on the power applying driving body 110, the front driver module 310 on the rotating shaft of the power applying driving body 110, and the rear driver module 350 on the rotor module 210.

As shown in FIGS. 1 and 2, the rotor module 210 includes: a rotary plate 212 having permanent magnet insertion holes 213 formed equally spaced with respect to a reference point 211 on the circumferential axis of a disc-shaped body having a rotating shaft through hole formed on the center thereof; and permanent magnets 216 inserted into the permanent magnet insertion holes 213 with respect to the reference point 211 of the rotary plate 212 in such a manner where N and S poles are alternately insertedly attached thereto.

The magnetic fluxes of the permanent magnets 216 are produced in the axial direction of the rotating shaft or in the direction perpendicular to the axial direction thereof.

In more detail, the rotor module 210 includes: a rotary plate 212 having 2n (n is an integer) permanent magnet insertion holes 213 formed equally spaced with respect to a reference point 211 on the circumferential axis of a disc-shaped body having a rotating shaft through hole formed on the center thereof; and 2n permanent magnets 216 inserted into the 2n permanent magnet insertion holes 213 with respect to the reference point 211 of the rotary plate 212 in such a manner where N and S poles are alternately insertedly attached thereto.

The magnetic fluxes of the 2n permanent magnets 216 are produced in the axial direction of the rotating shaft or in the direction perpendicular to the axial direction thereof.

As shown in FIGS. 1 and 3, each of the front driver module 310 and the rear driver module 350 includes: a fixing rod 312 having permanent magnet insertion holes 313 formed equally spaced in a circumferential direction around the rotor module 210 with respect to a reference point 311 on the circumferential axis of a cylindrical or disc-shaped body having a rotating shaft through hole formed on the center thereof in such a manner as to be closed on one surface thereof, while having a given gap from the rotor module 210; and permanent magnets 316 attachedly inserted into the permanent magnet insertion holes 313 with respect to the reference point 311 of the fixing rod 312 in such a manner where N and S poles are alternately insertedly attached thereto or insertedly attached thereto with three-phase arrangements.

The magnetic fluxes of the permanent magnets 316 are produced in the direction perpendicular to the magnetic fluxes of the permanent magnets 216 of the rotor module 210.

In more detail, each of the front driver module 310 and the rear driver module 350 includes: a fixing rod 312 having 2n (n is an integer greater than 2) or 3n permanent magnet insertion holes 313 formed equally spaced in a circumferential direction around the rotor module 210 with respect to a reference point 311 on the circumferential axis of a cylindrical or disc-shaped body having a rotating shaft through hole formed on the center thereof in such a manner as to be closed on one surface thereof, while having a given gap from the rotor module 210; and 2n or 3n permanent magnets 316 attachedly inserted into the 2n or 3n permanent magnet insertion holes 313 with respect to the reference point 311 of the fixing rod 312 in such a manner where N and S poles are alternately insertedly attached thereto or insertedly attached thereto with three-phase arrangements, the magnetic fluxes of the 2n or 3n permanent magnets 316 being produced in the direction perpendicular to the magnetic fluxes of the 2n or 3n permanent magnets 216 of the rotor module 210.

Next, an explanation on the operations of the power transmission apparatus 101 according to the first embodiment of the present invention will be given.

Under the above-mentioned configuration, the power transmission apparatus 101 according to the first embodiment of the present invention produces a rotational force by an induced magnetic field generated from the front driver module 310, a rotating magnetic field generated from the rotor module 210, and a rotating magnetic field generated from the rotor module 210 together with the rear driver module 350, using the rotational power applied from the power applying driving body 110, increases the produced rotational force through acceleration, and transmits the increased rotational power to a power receiving object 120.

In more detail, the power transmission apparatus 101 according to the present invention produces the rotational force by the induced magnetic field generated from the front driver module 310, the rotating magnetic field generated from the rotor module 210, and a rotating magnetic field generated from the rotor module 210 together with the rear driver module 350, using the rotational power applied from the power applying driving body 110, increases the produced rotational force through acceleration, and transmits the increased rotational power to the power receiving object 120.

In this case, the 2n (n is an integer) permanent magnets 216 of the rotor module 210 are disposed on the circumferential axis of the rotary plate 212 in such a manner as where their N and S poles are alternately arranged, and the 2n (n is an integer greater than 2) permanent magnets 316 of the front driver module 310 and the rear driver module 350 are disposed in the circumferential direction of the fixing rod 312 around the rotor module 210 in such a manner as where their N and S poles are alternately arranged. Otherwise, the 3n permanent magnets 316 of the front driver module 310 and the rear driver module 350 are disposed in the circumferential direction of the fixing rod 312 around the rotor module 210 in such a manner as where their N and S poles are disposed with three-phase arrangements.

As a result, the front driver module 310 and the rear driver module 350 face the rotor module 210 in the perpendicular direction to the rotor module 210, while having the given gap therefrom, and thus, the magnetic fluxes of the permanent magnets 216 of the rotor module 210 within the magnetic fields formed therearound produce virtual magnetic field rotation moment axes to cause attraction and repulsion forces between the permanent magnets 216 of the rotor module 210 and the permanent magnets 316 of the front driver module 310 and the rear driver module 350, thereby generating the rotational force.

If the rotating shaft of the power applying driving body 110 rotates, accordingly, the induced magnetic field is produced from the front driver module 310 to the rotor module 210 to allow the rotor module 210 to rotate with the rotating magnetic field, and next, the rotor module 210 produces the rotational force through the attraction and repulsion forces to and from the rear driver module 350, so that the rotational force is increased acceleratedly and the increased rotational power is transmitted to the power receiving object 120.

The output of the rotor module 210 is determined by the multiplication of the rotational moment and the number of rotations, and accordingly, the magnetic flux densities, the contact areas with the magnetic fields, the diameter pitches and the facing gaps with each other of the permanent magnets of the rotor module 210, the front driver module 310, and the rear driver module 350 are adjusted to desirably determine a maximum rotational force. Of course, the rotational power supplied from the power applying driving body 110 is adjusted to control the maximum rotational force in real time.

Further, more desirably, an electric or electro-magnetic clutch is mounted on the power applying driving body 110 to adjust the gap between the rotor module 210 and the front driver module 310, thereby controlling the strength of the magnetic field or serving to connect or disconnect the magnetic field.

Also, the power transmission apparatus 101 produces the rotational force through the attraction and repulsion forces between the permanent magnets and is thus driven with the magnetic rotational force, thereby achieving a small amount of driving loss, a high driving efficiency, extremely low noise, good durability, and no additional driving cost.

For example, as shown in FIG. 1, an electric air cooler 601, which includes the power transmission apparatus 101 according to the first embodiment of the present invention, a low power motor 410, an expander 511, and an expander case 515, is mounted on a cold air blower so that air is sucked to the expander case 515 by the expander 511 and expanded or accelerated to produce cold air, the flow rate of the cold air is increased, and the cold air is lowered to a given temperature or below to blow the cold air to a blower, thereby decreasing the amount of power consumed.

That is, the front driver module 310 is mounted on the rotating shaft of the motor 410, the rear driver module 350 on the rotor module 210, the rotor module 210 on the motor 410, the expander 511 on the rotating shaft of the rotor module 210, and the expander case 515 on the rotor module 210.

In this case, the front driver module 310 rotates with the rotational power of the low power motor 410 to produce the induced rotational force to the rotor module 210, thereby rotating the rotor module 210. The rotor module 210 rotates with the attraction and repulsion forces to and from the rear driver module 350, produces the rotational force, increases the rotational force through acceleration, and transmits the increased rotational power to the expander 511, so that the expander 511 is accelerated. At this time, the power supplied to the motor 410 is controlled to change the rotational force of the front driver module 310, thereby controlling the rotational force.

For another example, as shown in FIG. 1, an electric air cooler 603 for an air conditioner, which includes the power transmission apparatus 101 according to the first embodiment of the present invention, the low power motor 410, the expander 511, and the expander case 515, is mounted between a heat exchanger and a blower so that the cool air discharged from the heat exchanger is sucked to the expander case 515 by the expander 511 and expanded or accelerated to produce cold air, the cold air is lowered to raise the density thereof, and the flow rate of the cold air is increased, thereby decreasing the amount of power consumed.

That is, the front driver module 310 is mounted on the rotating shaft of the motor 410, the rear driver module 350 on the rotor module 210, the rotor module 210 on the motor 410, the expander 511 on the rotating shaft of the rotor module 210, and the expander case 515 on the rotor module 210.

In this case, the rotational force is produced by the rotational power of the low power motor 410 and then accelerated so that the rotor module 210 transmits the power to the expander 511 to accelerate the expander 511. At this time, the power supplied to the motor 410 is controlled to change the rotational force of the front driver module 310, thereby controlling the rotational force.

For yet another example, as shown in FIG. 4, an electric air accelerator 611 for a vacuum cleaner, which includes the power transmission apparatus 101 according to the first embodiment of the present invention, a low power motor 410, an axial expander 511 sucking and expanding air, and an expander case 515, is mounted so that air is sucked to the expander case 515 by the axial expander 511 to make a vacuumed state and the sucked air is separated from dust and the like through a filter to discharge only the air, thereby decreasing the amount of power consumed.

That is, the front driver module 310 is mounted on the rotating shaft of the motor 410, the rear driver module 350 on the rotor module 210, the rotor module 210 on the motor 410, the expander 511 on the rotating shaft of the rotor module 210, and the expander case 515 on the rotor module 210.

In this case, the rotational force is produced by the rotational power of the low power motor 410 and then accelerated so that the rotor module 210 transmits the power to the axial expander 511 to accelerate the axial expander 511. Further, as shown in FIG. 1, the centrifugal expander 511 is more desirably applied to enhance the degree of vacuum and to use an amount of air over a large range.

For another example, as shown in FIG. 5, an electric air supplier 623 for a fuel cell vehicle, which includes the power transmission apparatus 101 according to the first embodiment of the present invention, a low power motor 410, an impeller 521 and an impeller case 525, is mounted on an air filter and a fuel cell so that air is sucked to the impeller case 525 by the impeller 521 and is compressed or pressurized to raise the density thereof, and a boost pressure is thus produced, thereby supplying the amount of air over a large range to the fuel cell and decreasing the amount of power consumed.

That is, the front driver module 310 is mounted on the rotating shaft of the motor 410, the rear driver module 350 on the rotor module 210, the rotor module 210 on the motor 410, the impeller 521 on the rotating shaft of the rotor module 210, and the impeller case 525 on the rotor module 210.

In this case, the rotational force is produced by the rotational power of the low power motor 410 and then accelerated so that the rotor module 210 transmits the power to the impeller 521 to accelerate the impeller 521. At this time, the power supplied to the motor 410 is controlled to change the rotational force of the front driver module 310, thereby controlling the rotational force.

For another example, as shown in FIG. 1, an electric expanded air charger 605 for a naturally aspirated vehicle, which includes the power transmission apparatus 101 according to the first embodiment of the present invention, the low power motor 410, the expander 511, and the expander case 515, is mounted between an air filter and an air suction pipe so that air is sucked to the expander case 515 by the expander 511 and is expanded or accelerated to produce cool air, and the cool air is lowered to raise the density thereof, thereby increasing the charging efficiency and the output and improving the acceleration performance.

That is, the front driver module 310 is mounted on the rotating shaft of the motor 410, the rear driver module 350 on the rotor module 210, the rotor module 210 on the motor 410, the expander 511 on the rotating shaft of the rotor module 210, and the expander case 515 on the rotor module 210.

In this case, the rotational force is produced by the rotational power of the low power motor 410 and then accelerated so that the rotor module 210 transmits the power to the expander 511 to accelerate the expander 511. At this time, the power supplied to the motor 410 is controlled to change the rotational forces of the front driver module 310 and the rear driver module 350, thereby controlling the rotational forces. In this case, of course, the moment of rotation caused by the air flow applied to the expander 511 in correspondence to a negative suction pressure or a suction pressure changed in accordance with the load of an internal combustion engine is added to the moment of rotation caused by the magnetic rotational force of the rotor module 210 rotating at the same time through the moment of rotation.

For another example, as shown in FIG. 5, an electric air charger 621 for a supercharged vehicle, which includes the power transmission apparatus 101 according to the first embodiment of the present invention, the low power motor 410, the impeller 521 and the impeller case 525, is mounted on an air filter and an intake pipe so that air is sucked to the impeller case 525 by the impeller 521 and compressed or pressurized to raise the density thereof, and a boost pressure is thus produced, thereby enhancing the charging efficiency and output, reducing the load of the internal combustion engine and spool up time, and improving the acceleration performance.

That is, the front driver module 310 is mounted on the rotating shaft of the motor 410, the rear driver module 350 on the rotor module 210, the rotor module 210 on the motor 410, the impeller 521 on the rotating shaft of the rotor module 210, and the impeller case 525 on the rotor module 210.

In this case, the rotational force is produced by the rotational power of the low power motor 410 and then accelerated so that the rotor module 210 transmits the power to the impeller 521 to accelerate the impeller 521. At this time, the power supplied to the motor 410 is controlled to change the rotational force of the front driver module 310, thereby controlling the rotational force. In this case, of course, the moment of rotation caused by the air flow applied to the impeller 521 in correspondence to a negative suction pressure or a suction pressure changed in accordance with the load of an internal combustion engine is added to the moment of rotation caused by the magnetic rotational force of the rotor module 210 rotating at the same time through the moment of rotation.

For still another example, as shown in FIG. 6, an mechanical air charger 631 for a supercharged vehicle, which includes the power transmission apparatus 101 according to the first embodiment of the present invention, an idle pulley 420, an impeller 521 and an impeller case 525, is mounted on a belt drive system of an internal combustion engine so that air is sucked to the impeller case 525 by the impeller 521 and is compressed or pressurized to raise the density thereof, and a boost pressure is thus produced, thereby enhancing the charging efficiency and output, improving the acceleration performance, and reducing the frictional force, noise, and the load of the internal combustion engine.

That is, the front driver module 310 is mounted on the rotating shaft of the idle pulley 420, the rear driver module 350 on the rotor module 210, the rotor module 210 on a fixture of the idle pulley 420, the impeller 521 on the rotating shaft of the rotor module 210, and the impeller case 525 on the rotor module 210.

In this case, the idle pulley 420 rotates with the rotational power of the internal combustion engine and the rotational force of the idle pulley 420 is then accelerated so that the rotor module 210 transmits the power to the impeller 521 to accelerate the impeller 521. In this case, of course, the moment of rotation caused by the air flow applied to the impeller 521 in correspondence to a negative suction pressure or a suction pressure changed in accordance with the load of the internal combustion engine is added to the moment of rotation caused by the magnetic rotational force of the rotor module 210 rotating at the same time through the moment of rotation.

MODE FOR INVENTION

Now, an explanation on the parts and operations of a power transmission apparatus 102 according to a second embodiment of the present invention will be given.

First, the parts of the power transmission apparatus 102 will be explained.

As shown in FIGS. 7 and 11, the power transmission apparatus 102 according to the second embodiment of the present invention includes a rotor module 210, a front driver module 310 and a rear driver module 350 which are the same as in the first embodiment of the present invention and is disposed in such a manner where the rotor module 210 is mounted on a power receiving driving body 120 to mount the rotary body of the power receiving driving body 120 and the front driver module 310 and the rear driver module 350 on the rotor module 210.

In more detail, the power transmission apparatus 102 according to the second embodiment of the present invention includes the rotor module 210, the front driver module 310 and the rear driver module 350 which are the same as in the first embodiment of the present invention and is disposed in such a manner where the rotor module 210 is mounted on a power receiving driving body 120 to mount the rotary body of the power receiving driving body 120 and the front driver module 310 and the rear driver module 350 on the rotor module 210.

Next, an explanation on the operations of the power transmission apparatus 102 according to the second embodiment of the present invention will be given.

Under the above-mentioned configuration, the power transmission apparatus 102 according to the second embodiment of the present invention produces a rotational force by a magnetic field generated from the rotor module 210 together with the front driver module 310 and the rear driver module 350, using the rotational power applied from the power receiving driving body 120, increases the rotational force through acceleration, and transmits the rotational power to the power receiving driving body 120.

In more detail, the power transmission apparatus 102 according to the second embodiment of the present invention produces the rotational force by the magnetic field generated from the rotor module 210 together with the front driver module 310 and the rear driver module 350, using the rotational power applied from the power receiving driving body 120, increases the rotational force through acceleration, and transmits the rotational power to the power receiving driving body 120.

In this case, the 2n (n is an integer) permanent magnets 216 of the rotor module 210 are disposed on the circumferential axis of the rotary plate 212 in such a manner as where their N and S poles are alternately arranged, and the 2n (n is an integer greater than 2) permanent magnets 316 of the front driver module 310 and the rear driver module 350 are disposed in the circumferential direction of the fixing rod 312 around the rotor module 210 in such a manner as where their N and S poles are alternately arranged. Otherwise, the 3n permanent magnets 316 of the front driver module 310 and the rear driver module 350 are disposed in the circumferential direction of the fixing rod 312 around the rotor module 210 in such a manner as where their N and S poles are arranged with three-phase arrangements.

As a result, the front driver module 310 and the rear driver module 350 face the rotor module 210 in the perpendicular direction to the rotor module 210, while having the given gap therefrom, and thus, the magnetic fluxes of the permanent magnets 216 of the rotor module 210 within the magnetic fields formed therearound produce virtual magnetic field rotation moment axes to cause attraction and repulsion forces between the permanent magnets 216 of the rotor module 210 and the permanent magnets 316 of the front driver module 310 and the rear driver module 350, thereby generating the rotational force.

If the rotating shaft of the power receiving driving body 120 rotates, accordingly, the rotor module 210 rotates and produces a rotational force through the attraction and repulsion forces to and from the front driver module 310 and the rear driver module 350. The produced rotational force is increased acceleratedly and transmitted to the power receiving driving body 120.

For example, as shown in FIG. 7, an air cooler 641 for a naturally aspirated vehicle, which includes the power transmission apparatus 102 according to the second embodiment of the present invention, an expander 511, and an expander case 515, is mounted between an air filter and an intake pipe of an internal combustion engine so that air is sucked to the expander case 515 by the expander 511 and is expanded or accelerated to produce cool air, and the cool air is lowered in temperature to raise the density thereof, thereby increasing the charging efficiency and improving the output.

In FIG. 7, an arrow with slant lines indicates hot air flow, and an arrow with a checkered pattern indicates cold air flow.

That is, the front driver module 310 and the rear driver module 350 are mounted on the rotor module 210, the expander 501 on the rotating shaft of the rotor module 210, and the expander case 505 on the rotor module 210.

In this case, the expander 501 and the rotor module 210 rotate with the power of air flow caused by a negative suction pressure or a suction pressure of the internal combustion engine, and the rotor module 210 produces a rotational force through the attraction and repulsion forces to and from the front driver module 310 and the rear driver module 350, and increases the rotational force to transmit the rotational power to the expander 501, so that the expander 501 is accelerated.

For another example, as shown in FIG. 7, an air cooler 643 for a supercharged vehicle having a turbocharger or supercharger, which includes the power transmission apparatus 102 according to the second embodiment of the present invention, an expander 511, and an expander case 515, is mounted between a cooling device and an intake pipe so that the compressed air discharged from the cooling device is sucked to the expander case 515 by the expander 511 and is expanded or accelerated to produce expanded or accelerated air, and next, the air is lowered in temperature to raise the density thereof, thereby increasing the charging efficiency.

That is, the front driver module 310 and the rear driver module 350 are mounted on the rotor module 210, the expander 511 on the rotating shaft of the rotor module 210, and the expander case 515 on the rotor module 210.

In this case, the rotational force is produced by the power of air flow caused by the boost pressure of the internal combustion engine and is increased, so that the rotor module 210 transmits the power to the expander 511 to accelerate the expander 511.

Now, an explanation on the parts and operations of a power transmission apparatus 103 according to a third embodiment of the present invention will be given.

First, the parts of the power transmission apparatus 103 will be explained.

As shown in FIGS. 8 and 11, the power transmission apparatus 103 according to the third embodiment of the present invention includes a rotor module 210 and a front driver module 310 which are the same as in the first embodiment of the present invention and is disposed in such a manner where the rotor module 210 is mounted on a power applying driving body 110 and the front driver module 310 on the rotating shaft of the power applying driving body 110.

In more detail, the power transmission apparatus 103 according to the third embodiment of the present invention includes the rotor module 210 and the front driver module 310 which are the same as in the first embodiment of the present invention and is disposed in such a manner where the rotor module 210 is mounted on the power applying driving body 110 and the front driver module 310 on the rotating shaft of the power applying driving body 110.

In FIG. 8, an arrow with slant lines indicates hot air flow, and an arrow with a checkered pattern indicates cold air flow.

Next, an explanation on the operations of the power transmission apparatus 103 according to the third embodiment of the present invention will be given.

Under the above-mentioned configuration, the power transmission apparatus 103 according to the third embodiment of the present invention produces a rotational force from an induced magnetic field generated by the front driver module 310 and a rotating magnetic field generated by the rotor module 210, using the rotational power applied from the power applying driving body 110, increases the rotational force, and transmits the rotational power to a power receiving object 120.

In more detail, the power transmission apparatus 103 according to the third embodiment of the present invention produces the rotational force from the induced magnetic field generated by the front driver module 310 and the rotating magnetic field generated by the rotor module 210, using the rotational power applied from the power applying driving body 110, increases the rotational force, and transmits the rotational power to the power receiving object 120.

In this case, the 2n (n is an integer) permanent magnets 216 of the rotor module 210 are disposed on the circumferential axis of the rotary plate 212 in such a manner as where their N and S poles are alternately arranged, and the 2n (n is an integer greater than 2) permanent magnets 316 of the front driver module 310 are disposed in the circumferential direction of the fixing rod 312 around the rotor module 210 in such a manner as where their N and S poles are alternately arranged. Otherwise, the 3n permanent magnets 316 of the front driver module 310 are disposed in the circumferential direction of the fixing rod 312 around the rotor module 210 in such a manner as where their N and S poles are disposed with three-phase arrangements.

As a result, the front driver module 310 faces the rotor module 210 in the perpendicular direction to the rotor module 210, while having the given gap therefrom, and thus, the magnetic fluxes of the permanent magnets 216 of the rotor module 210 within the magnetic fields formed therearound produce virtual magnetic field rotation moment axes to cause attraction and repulsion forces between the permanent magnets 216 of the rotor module 210 and the permanent magnets 316 of the front driver module 310, thereby generating the rotational force.

If the rotating shaft of the power applying driving body 110 rotates, accordingly, the induced magnetic field is produced from the front driver module 310 to the rotor module 210 to allow the rotor module 210 to rotate with the rotating magnetic field, and next, the rotor module 210 produces the rotational force, so that the rotational force is increased acceleratedly and the increased rotational power is transmitted to the power receiving object 120.

For example, as shown in FIG. 8, the power transmission apparatus 103 according to the third embodiment of the present invention is applied to the electric air cooler 601 for the cold air blower, the electric air cooler 603 of the air conditioner, the electric air accelerator 611 for the vacuum cleaner, the electric air supplier 623 for the fuel cell vehicle, the electric expanded air charger 605 for the naturally aspirated vehicle, and the electric air charger 621 and the mechanical air charger 631 for the supercharged vehicle, which are suggested as the application examples in the first embodiment of the present invention.

Now, an explanation on the parts and operations of a power transmission apparatus 104 according to a fourth embodiment of the present invention will be given.

First, the parts of the power transmission apparatus 104 will be explained.

As shown in FIGS. 9 and 11, the power transmission apparatus 104 according to the fourth embodiment of the present invention includes a rotor module 210 and a rear driver module 350 which are the same as in the first embodiment of the present invention and is disposed in such a manner where the rotor module 210 is mounted on a power receiving driving body 120 to mount a rotary body of the power receiving driving body 120 and the rear driver module 350 on the rotor module 210.

In more detail, the power transmission apparatus 104 according to the fourth embodiment of the present invention includes the rotor module 210 and the rear driver module 350 which are the same as in the first embodiment of the present invention and is disposed in such a manner where the rotor module 210 is mounted on the power receiving driving body 120 to mount the rotary body of the power receiving driving body 120 and the rear driver module 350 on the rotor module 210.

In FIG. 9, an arrow with slant lines indicates hot air flow, and an arrow with a checkered pattern indicates cold air flow.

Next, an explanation on the operations of the power transmission apparatus 104 according to the fourth embodiment of the present invention will be given.

Under the above-mentioned configuration, the power transmission apparatus 104 according to the fourth embodiment of the present invention produces a rotational force from a magnetic field generated from the rotor module 210 together with the rear driver module 350, using the rotational power supplied from the power receiving driving body 120, and the rotational force is increased and transmitted to the power receiving driving body 120.

In more detail, the power transmission apparatus 104 according to the fourth embodiment of the present invention produces the rotational force from the magnetic field generated from the rotor module 210 together with the rear driver module 350, using the rotational power supplied from the power receiving driving body 120, and the rotational force is increased and transmitted to the power receiving driving body 120.

In this case, the 2n (n is an integer) permanent magnets 216 of the rotor module 210 are disposed on the circumferential axis of the rotary plate 212 in such a manner as where their N and S poles are alternately arranged, and the 2n (n is an integer greater than 2) permanent magnets 316 of the rear driver module 350 are disposed in the circumferential direction of the fixing rod 312 around the rotor module 210 in such a manner as where their N and S poles are alternately arranged. Otherwise, the 3n permanent magnets 316 of the rear driver module 350 are disposed in the circumferential direction of the fixing rod 312 around the rotor module 210 in such a manner as where their N and S poles are disposed with three-phase arrangements.

As a result, the rear driver module 350 faces the rotor module 210 in the perpendicular direction to the rotor module 210, while having the given gap therefrom, and thus, the magnetic fluxes of the permanent magnets 216 of the rotor module 210 within the magnetic fields formed therearound produce virtual magnetic field rotation moment axes to cause attraction and repulsion forces between the permanent magnets 216 of the rotor module 210 and the permanent magnets 316 of the rear driver module 350, thereby generating the rotational force.

If the rotating shaft of the power receiving driving body 120 rotates with the rotational power received thereto, accordingly, the rotor module 210 rotates to produce the rotational force with the attraction and repulsion forces to and from the rear driver module 350, to increase the rotational force, and to transmit the rotational power and the power of the rotating magnetic field to the power receiving driving body 120.

For example, as shown in FIG. 9, the air cooler 641 for a naturally aspirated vehicle, as the application example in the second embodiment of the present invention, which includes the power transmission apparatus 104 according to the fourth embodiment of the present invention, an expander 511, an expander case 515 and a generator 530, is mounted between an air filter and an air suction pipe of an internal combustion engine so that air is sucked to the expander case 515 by the expander 511 and is expanded or accelerated to produce cool air, and the cool air is lowered in temperature to raise the density thereof, thereby conducting the generation with a high charging efficiency.

That is, the rear driver module 350 is mounted on the rotor module 210, the expander 511 on the rotating shaft of the rotor module 210, and the expander case 515 and the generator 530 on the rotor module 210.

In this case, the expander 511 and the rotor module 210 rotate with the power of air flow caused by a negative suction pressure or a suction pressure of the internal combustion engine, and the rotor module 210 rotates with the attraction and repulsion forces to and from the rear driver module 350 to produce the rotational force, to increase the rotational force, and to transmit the rotational power to the expander 501, so that the expander 511 is accelerated to expand or accelerate the sucked air, and further, the rotor module 210 transmit the power of the rotating magnetic fields to the generator 530, thereby producing power to be usefully used.

For another example, as shown in FIG. 9, the air cooler 643 for a supercharged vehicle having a turbocharger or supercharger, as the application example in the second embodiment of the present invention, which has the power transmission apparatus 104 according to the fifth embodiment of the present invention, an expander 511, an expander case 515 and a generator 530, is mounted between a cooling device and an air suction pipe so that the compressed air discharged from the cooling device is sucked to the expander case 515 by the expander 511 and is expanded or accelerated to produce expanded or accelerated air, and the air is lowered in temperature to raise the density thereof, thereby conducting the generation with a high charging efficiency.

That is, the rear driver module 350 is mounted on the rotor module 210, the expander 511 on the rotating shaft of the rotor module 210, and the expander case 515 and the generator 530 on the rotor module 210.

In this case, the rotational force is produced by the power of air flow caused by the boost pressure of the internal combustion engine and is increased to allow the rotor module 210 to transmit the power to the expander 511 so that the expander 511 is accelerated to expand or accelerate the sucked air, and further, the rotor module 210 transmits the power of the rotating magnetic fields to the generator 530, thereby producing power to be usefully used.

Now, an explanation on the parts and operations of a power transmission apparatus 105 according to a fifth embodiment of the present invention will be given.

First, the parts of the power transmission apparatus 105 will be explained.

As shown in FIGS. 10 and 11, the power transmission apparatus 105 according to the fifth embodiment of the present invention includes a rotor module 210 and a rear driver module 350 which are the same as in the first embodiment of the present invention and is disposed in such a manner where the rotor module 210 is mounted on a power applying driving body 110 and the rear driver module 350 on the rotor module 210.

In more detail, the power transmission apparatus 105 according to the fifth embodiment of the present invention includes the rotor module 210 and the rear driver module 350 which are the same as in the first embodiment of the present invention and is disposed in such a manner where the rotor module 210 is mounted on the power applying driving body 110 and the rear driver module 350 on the rotor module 210.

In FIG. 10, an arrow with slant lines indicates hot air flow, and an arrow with a checkered pattern indicates cold air flow.

Next, an explanation on the operations of the power transmission apparatus 105 according to the fifth embodiment of the present invention will be given.

Under the above-mentioned configuration, the power transmission apparatus 105 according to the fifth embodiment of the present invention produces a rotational force from an induced magnetic field generated from the rotor module 210 and a rotating magnetic field generated from the rotor module 210 together with the rear driver module 350, using the power of the induced magnetic field supplied from the power applying driving body 110, increases the rotational force through acceleration, and transmits the rotational power to a power receiving object 120.

In more detail, the power transmission apparatus 105 according to the fifth embodiment of the present invention produces the rotational force from the induced magnetic field generated from the rotor module 210 and the rotating magnetic field generated from the rotor module 210 together with the rear driver module 350, using the power of the induced magnetic field supplied from the power applying driving body 110, increases the rotational force through acceleration, and transmits the rotational power to the power receiving object 120.

In this case, the 2n (n is an integer) permanent magnets 216 of the rotor module 210 are disposed on the circumferential axis of the rotary plate 212 in such a manner as where their N and S poles are alternately arranged, and the 2n (n is an integer greater than 2) permanent magnets 316 of the rear driver module 350 are disposed in the circumferential direction of the fixing rod 312 around the rotor module 210 in such a manner as where their N and S poles are alternately arranged. Otherwise, the 3n permanent magnets 316 of the rear driver module 350 are disposed in the circumferential direction of the fixing rod 312 around the rotor module 210 in such a manner as where their N and S poles are disposed with three-phase arrangements.

As a result, the rear driver module 350 and the power applying driving body 110 face the rotor module 210, while having the given gap therefrom, and thus, the magnetic fluxes of the permanent magnets 216 of the rotor module 210 within the magnetic fields formed therearound produce virtual magnetic field rotation moment axes to cause attraction and repulsion forces between the permanent magnets 216 of the rotor module 210 and the permanent magnets 316 of the rear driver module 350, thereby generating the rotational force.

If the induced magnetic field is produced by the power applying driving body 110, accordingly, the rotor module 210 rotates to produce the rotational force with the attraction and repulsion forces to and from the rear driver module 350, to increase the rotational force, and to transmit the rotational power to the power receiving object 120.

For example, as shown in FIG. 10, the power transmission apparatus 105 according to the fifth embodiment of the present invention and a magnetic field generator 450, instead of the electric motor, are applied to the electric air cooler 601 for the cold air blower, the electric air cooler 603 for the air conditioner, the electric air accelerator 611 for the vacuum cleaner, the electric air supplier 623 for the fuel cell vehicle, the electric expanded air charger 605 for the naturally aspirated vehicle, and the electric air charger 621 for the supercharged vehicle, which are suggested as the application examples in the first embodiment of the present invention.

INDUSTRIAL APPLICABILITY

The present invention is applicable to power transmission apparatuses used for an air conditioner, a vehicle, and so on.

The invention claimed is:

1. A power transmission apparatus using magnetic fields, the apparatus comprising:
a power applying driving body for supplying rotational power;
a rotor module rotatably coupled to the power applying driving body and having a plurality of permanent magnets that generates a first magnetic field; and
at least one of a front driver module and a rear driver module that are in spaced-apart relationships with the rotor module and disposed at front and rear sides of the rotor module, respectively, wherein each of the front and rear driver modules has a plurality of permanent magnets that generates a second magnetic flux in a direction perpendicular to the first magnetic flux and wherein the first magnetic flux interacts with the second magnetic flux to deliver a rotational force to the rotor module,
wherein the rotor module comprises: a rotary plate having 2n (hereinafter, n is an integer) permanent magnet insertion holes that are equally spaced apart from each other along a circumferential direction, wherein the rotary plate has a rotating shaft through hole formed on a center thereof, wherein 2n permanent magnets are inserted into the 2n permanent magnet insertion holes and arranged to have alternating polarity along the circumferential direction and wherein the first magnetic flux is arranged in an axial direction of a rotating shaft or in a direction perpendicular to the axial direction, and
wherein each of the front driver module and the rear driver module comprises: a fixing rod being in a shape of a disc or a cylinder having a cap on one end, wherein the fixing rod includes 2n or 3n (hereinafter, n is an integer greater than 1) permanent magnet insertion holes that are equally spaced apart from each other along the circumferential direction, wherein the fixing rod further includes a rotating shaft through hole formed on a center thereof and wherein 2n or 3n permanent magnets are inserted into the 2n or 3n permanent magnet insertion holes and arranged to have alternating polarity or a three-phase arrangement.

2. The power transmission apparatus using magnetic fields according to claim 1, further comprising a generator disposed on the front driver module or the rear driver module and configured to produce electrical power.

3. A power transmission apparatus using magnetic fields, the apparatus comprising:
a magnetic field generator for producing a first magnetic flux upon receiving electrical power;
a rotor module spaced apart from the magnetic field generator and having a plurality of permanent magnets that generates a second magnetic flux in a direction perpendicular to a direction of the first magnetic flux, wherein the first magnetic flux interacts with the second magnetic flux to deliver a rotational force to the rotor module; and
a rear driver module spaced apart from the rotor module and having a plurality of permanent magnets that generates a third magnetic flux in a direction perpendicular to the second magnetic flux, wherein the second magnetic flux interacts with the third magnetic flux to deliver a rotational force to the rotor module,
wherein the rotor module comprises: a rotary plate having 2n (hereinafter, n is an integer) permanent magnet insertion holes that are equally spaced apart from each other along a circumferential direction, wherein the rotary plate has a rotating shaft through hole formed on a center thereof, wherein 2n permanent magnets are inserted into the 2n permanent magnet insertion holes and arranged to have alternating polarity along the circumferential direction and wherein the second magnetic flux is arranged in an axial direction of a rotating shaft or in a direction perpendicular to the axial direction, and
wherein the rear driver module comprises: a fixing rod being in a shape of a disc or a cylinder having a cap on one end, wherein the fixing rod includes 2n or 3n (hereinafter, n is an integer greater than 1) permanent magnet insertion holes that are equally spaced apart from each other along the circumferential direction, wherein the fixing rod further includes a rotating shaft through hole formed on a center thereof and wherein 2n or 3n permanent magnets are inserted into the 2n or 3n permanent magnet insertion holes and arranged to have alternating polarity or a three-phase arrangement.

4. A power transmission apparatus using magnetic fields, the apparatus comprising:
a power applying driving body for supplying rotational power;
a front driver module configured to rotate with the power applying driving body and having a plurality of permanent magnets that generates a first magnetic field; and
a rotor module spaced apart from the front driver module and having a plurality of permanent magnets that generates a second magnetic flux in a direction perpendicular to the first magnetic flux, wherein the first magnetic flux interacts with the second magnetic flux to deliver a rotational force to the rotor module; and
a rear driver module spaced apart from the rotor module and having a plurality of permanent magnets that generates a third magnetic flux in a direction perpendicular to the second magnetic flux to deliver a rotational force to the rotor module,
wherein the rotor module comprises: a rotary plate having 2n (hereinafter, n is an integer) permanent magnet insertion holes that are equally spaced apart from each other along a circumferential direction, wherein the rotary plate has a rotating shaft through hole formed on a center thereof, wherein 2n permanent magnets are inserted into the 2n permanent magnet insertion holes and arranged to have alternating polarity along the circumferential direction and wherein the second magnetic flux is arranged in an axial direction of a rotating shaft or in a direction perpendicular to the axial direction, and
wherein the front driver module comprises: a fixing rod being in a shape of a disc or a cylinder having a cap on one end, wherein the fixing rod includes 2n or 3n (hereinafter, n is an integer greater than 1) permanent magnet insertion holes that are equally spaced apart from each other along the circumferential direction, wherein the fixing rod further includes a rotating shaft through hole formed on a center thereof; and wherein 2n or 3n permanent magnets are inserted into the 2n or 3n permanent magnet insertion holes and arranged to have alternating polarity or a three-phase arrangement.

5. A power transmission apparatus using magnetic fields, the apparatus comprising:
a power applying driving body for supplying rotational power;

a front driver module configured to rotate with the power applying driving body and having a plurality of permanent magnets to generate a first magnetic flux; and
a rotor module spaced apart from the front driver module and having a plurality of permanent magnets that generate a second magnetic flux in a direction perpendicular to the first magnetic flux, wherein the first magnetic flux interacts with the second magnetic flux to deliver a rotational force to the rotor module,
a rear driver module spaced apart from the rotor module and having a plurality of permanent magnets that generate a third magnetic flux in a direction perpendicular to the second magnetic flux, wherein the second magnetic flux interacts with the third magnetic flux to deliver a rotational force to the rotor module; and
a power receiving driving body coupled to the rotor module to receive rotational power through a rotational shaft,
wherein the rotor module comprises a rotary plate having 2n (hereinafter, n is an integer) permanent magnet insertion holes that are equally spaced apart from each other along a circumferential direction, wherein the rotary plate has a rotating shaft through hole formed on a center thereof, wherein 2n permanent magnets are inserted into the 2n permanent magnet insertion holes and arranged to have alternating polarity along the circumferential direction and wherein the second magnetic flux is arranged in an axial direction of the rotating shaft or in a direction perpendicular to the axial direction, and
wherein each of the front driver module and the rear driver module comprises: a fixing rod being in a shape of a disc or a cylinder having a cap on one end, wherein the fixing rod includes 2n or 3n (hereinafter, n is an integer greater than 1) permanent magnet insertion holes that are equally spaced apart from each other along the circumferential direction, wherein the fixing rod further includes a rotating shaft through hole formed on a center thereof and wherein 2n or 3n permanent magnets are inserted into the 2n or 3n permanent magnet insertion holes and arranged to have alternating polarity or a three-phase arrangement.

* * * * *